United States Patent [19]

Matsui

[11] Patent Number: 4,609,171
[45] Date of Patent: Sep. 2, 1986

[54] ELECTRIC WIRE BUNDLE CLAMP

[75] Inventor: Kazuhiro Matsui, Toyoake, Japan

[73] Assignee: Kitagawa Industries Co., Ltd., Nagoya, Japan

[21] Appl. No.: 641,192

[22] Filed: Aug. 16, 1984

[30] Foreign Application Priority Data

Sep. 5, 1983 [JP] Japan .................. 58-137708[U]
Oct. 14, 1983 [JP] Japan .................. 58-192675

[51] Int. Cl.⁴ .............................................. F16L 3/08
[52] U.S. Cl. ............................. 248/74.3; 24/16 PB; 248/49; 248/68.1; 248/74.2; 248/316.1
[58] Field of Search .............. 248/74.3, 74.2, 74.1, 248/74.5, 68.1, 49, 316.1, 317.7; 24/16 PB, 616, 543

[56] References Cited

U.S. PATENT DOCUMENTS

| | | | |
|---|---|---|---|
| 3,515,363 | 6/1970 | Fisher | 248/74.5 X |
| 3,516,631 | 6/1970 | Santucci | 24/16 PB |
| 3,529,795 | 9/1970 | Van Niel | 24/16 PB |
| 3,637,177 | 1/1972 | Santucci | 248/74.5 |
| 3,942,750 | 9/1976 | Noorily | 24/16 PB X |
| 4,061,873 | 12/1977 | Berg et al. | 24/543 X |
| 4,356,599 | 11/1982 | Larson et al. | 24/16 PB |
| 4,439,896 | 4/1984 | Matsui | 24/16 PB |
| 4,455,715 | 6/1984 | Matsui | 24/16 PB |
| 4,457,482 | 7/1984 | Kitagawa | 248/74.3 |

FOREIGN PATENT DOCUMENTS

| | | |
|---|---|---|
| 600637 | 3/1978 | Switzerland . |
| 774054 | 5/1957 | United Kingdom . |
| 798042 | 7/1958 | United Kingdom . |
| 1520817 | 8/1978 | United Kingdom . |
| 2130290 | 5/1984 | United Kingdom . |

Primary Examiner—Ramon O. Ramirez
Attorney, Agent, or Firm—Oblon, Fisher, Spivak, McClelland & Maier

[57] ABSTRACT

An electric wire bundle clamp having a mounting base, an elastic curved member provided on the mounting base so as to be integral at one end thereof with the mounting base and open at the other end, and a retaining portion formed on the mounting base for retaining the open end of the elastic curved member, in which the open end of the elastic curved member is bent outwards elastically deformably to form a bent portion with a stepped retaining projection formed in the vicinity thereof and a part of the bent end portion is used as a clamp operating piece, while on the mounting base are provided at least two projections which are spaced from each other so that the bent portion of the open end of the elastic curved member can be inserted therebetween, and on the inner surface of an outside one of the projections on the mounting base is formed a retaining projection capable of engaging the above retaining projection formed in the vicinity of the bent portion. Because of such a construction, it is possible to easily perform clamping and unclamping operations, and the electric wire bundle once clamped is held firmly in the clamped state and is seldom unclamped. Besides, there is given a large tolerance of the maximum clamping diameter which permits a positive and elastic clamping regardless of a slight increase or decrease in the diameter of the electric wire bundle to be clamped. Further, the wire bundle clamp of the above construction is easy to handle even in a narrow space.

16 Claims, 18 Drawing Figures

ELECTRIC WIRE BUNDLE CLAMP

BACKGROUND OF THE INVENTION (1) Field of Art

The present invention relates to an electric wire bundle clamp for fixing an electric wire bundle to a chassis, a panel board or the like.

(2) Prior Art

In a conventional electric wire clamp bundle, for example as shown in FIGS. 1(A) and 1(B), C-shaped elastic curved members 2 and 3 formed by an integral molding on mounting bases 1A and 1B respectively are each in the form of a single belt, so the curved members per se are not expansible when clamping an electric wire bundle. Therefore, as the volume of the electric wire bundle to be clamped increases, the moment the diameter of the electric wire bundle exceeds even slightly the tolerance of the clamp, it becomes difficult for retaining projections 5 and 6 to engage retaining portions 8 and 9, so clamping becomes impossible. Thus, the tolerance of the clamping diameter is very small.

In order to clamp an electric wire bundle firmly without looseness, it is desirable to clamp the bundle to the limit of the above clamp tolerance. But, in the conventional electric wire bundle clamps, as mentioned above, the clamping tolerance is so small that it is difficult to effect clamping if the size of the electric wire bundle to be clamped exceeds the maximum clamp diameter even a little. Conversely, if the former is smaller even slightly than the latter, there is formed a gap between the clamp and the electric wire bundle, thus making it impossible to clamp the bundle firmly without looseness. In an effort to solve this problem, there has been proposed such an electric wire bundle clamp as shown in FIG. 1(C), in which a plurality of retaining projections 7 are formed on a C-shaped elastic curved member 4 to make the maximum clamping diameter adjustable. But, also in this case, the C-shaped elastic curved member 4 is in a mere belt form and is not elastically expansible in its arcuate direction, so it is impossible to clamp an electric wire bundle elastically firmly and thus the above-mentioned problem has not been solved yet.

Moreover, the retaining projections 5, 6 and 7 are rigidly integral with the C-shaped elastic curved members 2, 3 and 4, respectively. For unlocking, therefore, it is necessary to first create a loosened state by holding with fingers finger-hold portions 11, 12 and 13 and like portions 51, 52 and 53 provided on the mounting base side and then pushing the finger-hold portions 11, 12 and 13 inside the C-shaped elastic curved members to disengage the retaining projections 5, 6 and 7 from the mounting base side retaining portions. Therefore, in a narrow place where electric wires, electronic devices, parts, etc. are concentrated, it is very difficult to effect unclamping and handling.

Further, in such conventional clamps as shown in FIGS. 1(A) to 1(C) in which the retaining projections 5, 6 and 7 are rigidly integral with the C-shaped curved members 2, 3 and 4, it is necessary, for unlocking, to push down an end part of each finger-hold portion to create a gap between the retaining projections 5, 6 and 7 and the fore ends 8, 9 and 10 of the finger-hole portions 51, 52 and 53 engaged therewith. Particularly where the size of the electric wire bundle to be clamped is at the maximum of the clamping tolerance, the retaining projections 5, 6 and 7 are pushed against the finger-hold portions 51, 52 and 53 during clamping, so it is impossible to effect unlocking unless the fingerhold portion is pushed down to an extremely large extent to open the gap. Besides, in case the finger-hold portions 51, 52 and 53 undergo a permanent deformation or an excessive stress deformation and an upward force is exerted on the electric wire bundle and a like force exerted also on the C-shaped elastic curved members 2, 3 and 4 during clamping, the electric wire bundle is easily disengaged from the clamp. Such a drawback can be overcome by enhancing the rigidity of the C-shaped elastic curved members or that of the finger-hold portions 51, 52 and 53. In this case, however, because of the enhanced rigidity, it is no longer easy to push in the C-shaped elastic curved members 2, 3 and 4 and bend the finger-hold portions 51, 52 and 53. Thus, in such a conventional clamp, once the rigidity is enhanced to make disengagement of the clamped electric wire bundle difficult, it becomes difficult to effect unlocking. Conversely, weakening the rigidity to make unlocking easier results in the clamped electric wire bundle being disengaged more easily. Thus, the sureness of clamping and the easiness of unlocking are incompatible with each other. Further, the open ends of the C-shaped elastic curved members must be pushed in near the fore ends of the finger-hold portions 51, 52 and 53 where there is only a narrow gap, and it is troublesome to guide such open ends exactly near the fore ends of the finger-hold portions 51, 52 and 53.

SUMMARY OF THE INVENTION

The present invention has been effected in view of the above-mentioned circumstances, and it is an object thereof to provide an electric wire bundle clamp capable of easily clamping and unclamping an electric wire bundle and whereby the electric wire bundle once clamped is surely held in the clamped state and is seldom disengaged from the clamp.

It is another object of the present invention to provide an electric wire bundle clamp whereby even an oversized electric wire bundle can be clamped through an elastic deformation of elastic protrusions and whereby a stress concentration is relieved to prevent the occurrence of damage even when a bending force is exerted on a C-shaped elastic curved member.

It is a further object of the present invention to provide an electric wire bundle clamp whereby an electric wire bundle once clamped is held firmly and not disengaged from the clamp even when an upward force is exerted on an elastic curved member.

It is still a further object of the present invention to provide an electric wire bundle clamp capable of clamping an electric wire bundle elastically firmly regardless of a slight increase or decrease of the electric wire bundle clamping diameter, having a large tolerance of the maximum clamping diameter and being easy to handle even in a narrow place such as the interior of an electronic device or the like.

The gist of the present invention, which has been effected in order to achieve the above-mentioned objects, resides in an electric wire bundle clamp having a mounting base, an elastic curved member provided on the mounting base, one end of the elastic curved member being integral with the mounting base and the other end thereof being an open end, and a retaining portion provided on the mounting base for retaining the open end of the elastic curved member, in which the open end is bent outwardly in a V-shape and is elastically deformably, the open end thus bent having a stepped retaining projection formed in the vicinity of its bent portion and a clamp operating piece formed at part of its bent end portion, while on the mounting base there are provided at least two projections spaced from each other so that the bent portion of the open end can be inserted therebetween, the outside one of the two projections being provided on the inner surface thereof with a retaining projection capable of being engaged with the retaining projection of the open end.

DESCRIPTION OF PREFERRED EMBODIMENTS

Figure 1A:
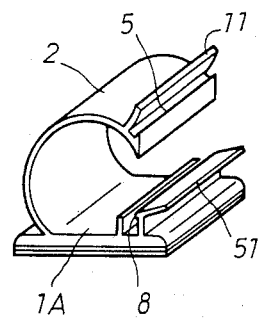
FIGS. 1(A), 1(B) and 1(C) are perspective views of conventional electric wire bundle clamps.
Figure 1B:
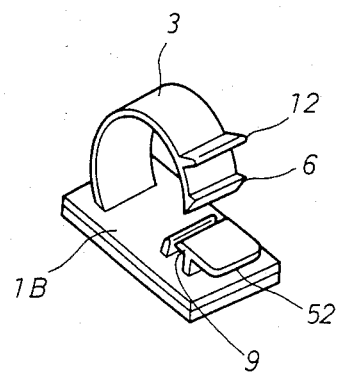
Figure 1C:
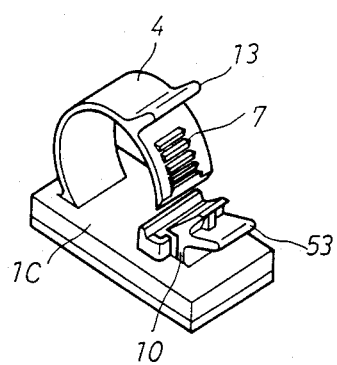
Figure 2:
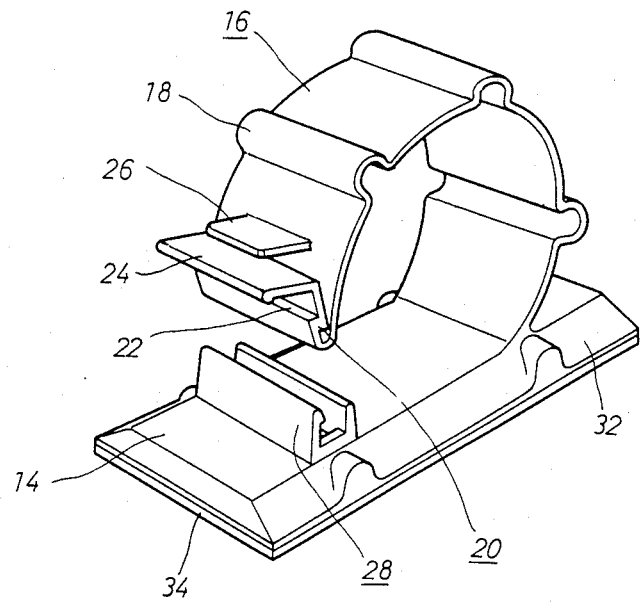
FIG. 2 is a perspective view of an electric wire bundle clamp according to a first embodiment of the present invention.
Figure 3:
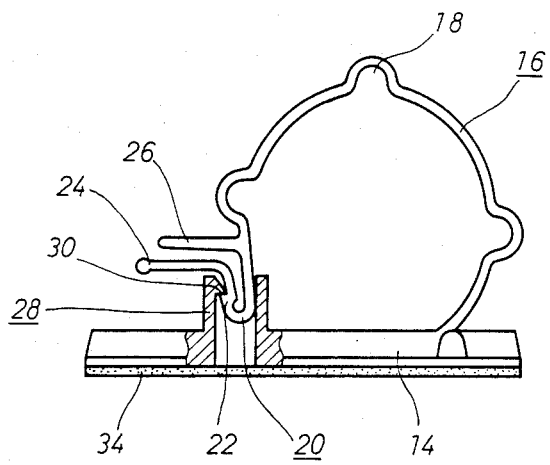
FIG. 3 is a front view thereof (partly broken away)

A first embodiment of the present invention will now be described in detail with reference to the drawings. In FIGS. 2 and 3, the numeral 14 denotes a mounting base formed of elastic synthetic resin (e.g. nylon). On the mounting base 14 is provided by an integral molding a C-shaped elastic curved member 16 having a predetermined width. The curved member 16 per se is locally curved from its inside toward its outside to form elastic protrusions 18 in its width direction, namely, in the direction in which an electric wire bundle to be clamped is inserted, both ends of each elastic protrusion 18 being open at both side portions of the curved member 16, whereby the curved member 16 is made somewhat expansible in its maximum clamping diameter according to the volume of the electric wire bundle to be clamped, and a stress concentration can be relieved. The elastic protrusions 18 are provided in three positions at substantially equal intervals on the curved member 16. The number of the elastic protrusions 18 may be increased or decreased as necessary.

Figure 4:
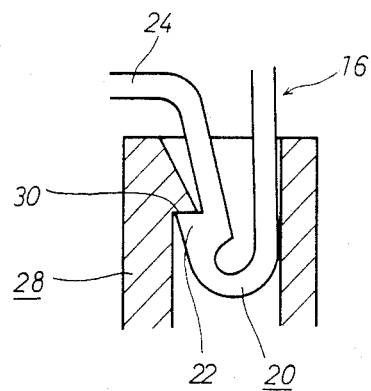
FIG. 4 is a partially enlarged view thereof.

An open end side of the curved member 16 is bent outwards at an angle close to 180° and is elastically deformable. In the vicinity of a bent portion 20 thus formed is formed a stepped retaining projection 22 as shown in FIG. 4, and the fore end portion further extending from the bent portion 20 is further bent outwards to form a clamp operating piece 24. On the curved member 16 is provided a finger-hold portion 26 projecting in a position close to the clamp operating piece 24. The position of the retaining projection 22 can be changed inwards by holding the clamp operating piece 24 together with the finger-hold portion 26 and lifting its fore end to cause an elastic deformation of the bent portion 20.

On the other hand, on the mounting base 14 is formed a projecting portion 28 capable of locking the retaining projection 22. The projecting portion 28 is composed of four side walls which surround the retaining projection 22 to be locked, and a retaining projection 30 formed on the inside of the side wall opposed to the retaining projection 22 so that it can lock the retaining projection 22. The side walls parallel to the bent portion 20 serve as projections, while one side wall opposed to an end face of the retaining projection 22 is formed lower than the other side walls so that the retaining projection 22 can also be inserted sideways and locked in the projecting portion 28. Both side portions of the mounting base 14 are largely chamfered to form slant portions 32. Consequently, the electric wire bundle is not easily to damaged even when pulled at the time of its insertion.

To the lower surface of the mounting base 14 is adhered an adhesive tape 34 whereby the clamp can be fixed to a chassis or the like. In place of the adhesive tape there may be used other conventional fixing means; for example, a pair of elastic hook pieces capable of expanding right and left provided at the fore end portion of a support member may be inserted in a fixing hole of a chassis or the like to mount the clamp.

In the electric wire bundle clamp constructed as above, by raising the clamp operating piece 24, the retaining projections 22 and 30 are disengaged from each other and the bent portion 20 moves up by virtue of the elasticity of the curved member 16, so that the electric wire bundle to be clamped can be inserted through the resultant gap between the bent portion 20 and the projecting portion 28. Then, by pushing the bent portion 20 into the projecting portion 28, the retaining projections 22 and 30 are engaged and locked with each other, so the electric wire bundle can be clamped. Once clamped, the electric wire bundle is prevented from shifting sideways or being unclamped incidentally because the retaining projection 22 is surrounded by side walls on all sides. Moreover, since the curved member 16 is formed with the elastic projections 18, it can expand through the elastic deformation of the elastic protrusions 18 and so can firmly clamp the electric wire bundle even in the event of an oversize of the bundle relative to the clamping diameter of the electric wire bundle clamp. Further, even in the event that a sudden bending stress is applied to the curved member 16, a stress concentration is relieved by the elastic protrusions 18, so the electric wire bundle will not be damaged. The clamped state can be released merely by pushing in the clamp operating piece 24 toward the inside of the C-shaped elastic curved member to disengage the retaining projections 22 and 30 from each other, and thus the unclamping operation can be done even with one finger, that is, the clamp is easily employable even in a narrow space.

Figure 5:
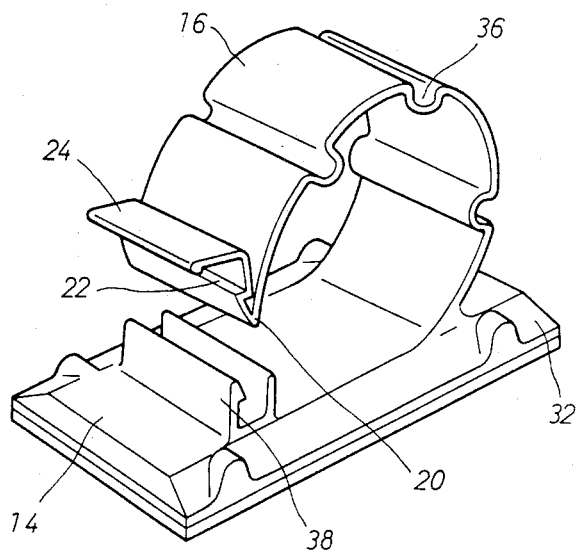
FIG. 5 is a perspective view of an electric wire bundle clamp according to a second embodiment of the present invention.

Referring now to FIG. 5, there is illustrated an electric wire bundle clamp according to a second embodiment of the present invention, which is constructed in the same way as in the first embodiment except that the elastic protrusions 18 are substituted by inwardly curved elastic protrusions 36, that the finger-hold portion 26 is omitted and that a retaining portion 38 composed of two side walls in provided. The portions common to the first embodiment are indicated by the same reference numerals and their explanation is omitted.

Figure 6:
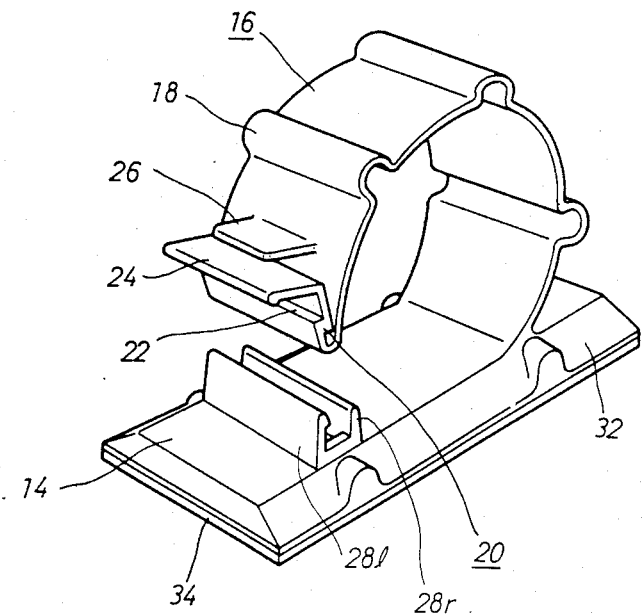
FIG. 6 is a perspective view of an electric wire bundle clamp according to a third embodiment of the present invention.
Figure 7:
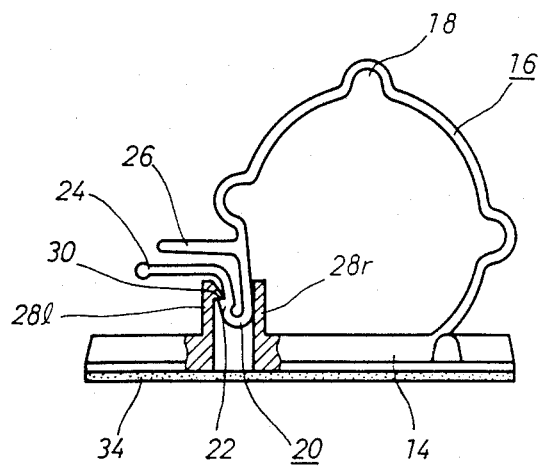
FIG. 7 is a partly cut-away front view thereof.
Figure 8:
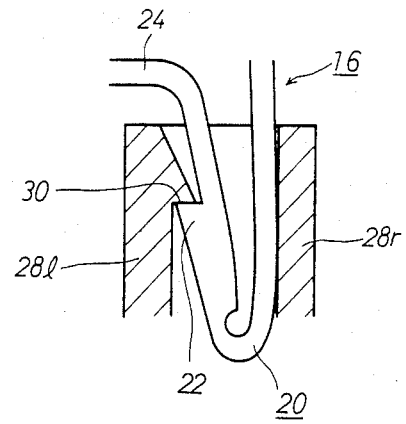
FIG. 8 is a partially enlarged view thereof.

Referring now to FIGS. 6, 7 and 8, there is illustrated an electric wire bundle according to a third embodiment of the present invention, which is almost the same as the first embodiment except that, as shown in FIG. 8, the open end side of a curved member 16 is bent outwards in a V-shaped form and elastically deformably to form a bent portion 20 which is longer than that in the first embodiment.

In the electric wire bundle clamp thus constructed, by slantwise raising a clamp operating piece 24, retaining projections 22 and 30 are disengaged from each other and the bent portion 20 moves upward by virtue of the elasticity of the curved member 16, so the electric wire bundle to be clamped can be inserted in the clamp. After insertion of the wire bundle, the retaining projections 22 and 30 are engaged an locked with each other by pushing the bent portion 20 into the gap formed between projections 28*l* and 28*r*, so the wire bundle is clamped. Once locked, the bent portion 20 is prevented from shifting sideways and from being unlocked incidentally because the retaining portion 22 is surrounded by side walls on all sides. Moreover, since the curved member 16 is formed with elastic protrusions 18, it can expand through the elastic deformation of the elastic protrusions 18 and so can firmly clamp the wire bundle even in the event of an oversize of the wire bundle relative to the clamping diameter of the electric wire bundle clamp. Further, even in case a sudden bending stress is applied to the curved member 16, a stress concentration is relieved by the elastic protrusions 18, so the wire bundle will not be damaged. The wire bundle can be unclamped merely by pushing the clamp operating piece 24 obliquely upwards to disengage the retaining projections 22 and 30 from each other, and thus the unclamping operation can be done even with one finger, that is, even a narrow space permits an easy use of the clamp.

Figure 9:
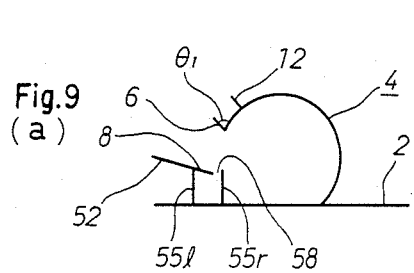
FIG. 9 typically illustrates operations of a conventional clamp and the clamp of the third embodiment of the invention, in which (a) and (b) show unclamped states, (c) and (d) show clamped states, (e) and (f) show unclamping states, and (c) and (d) show clamped states, (e) and (f) show unclamping states, and (g) and (h) show clamped states in which an upward force is exerted on each elastic curved member.
Figure 9:
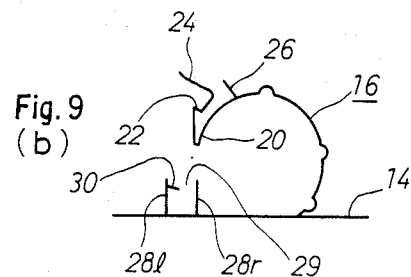
Figure 9:
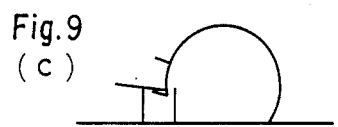
Figure 9:
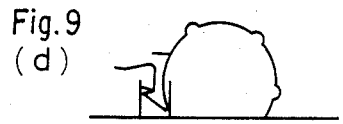
Figure 9:
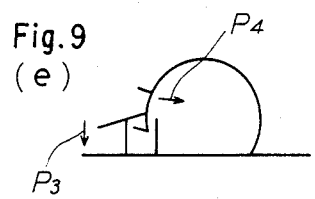
Figure 9:
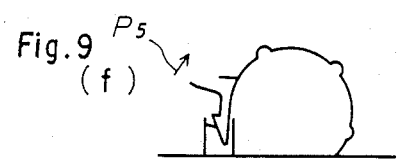
Figure 9:
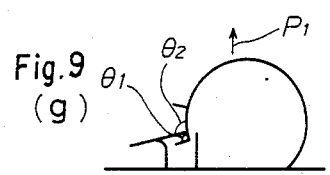
Figure 9:
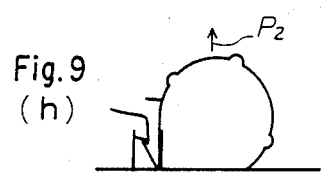

The operation and effect of this embodiment will now be described in more detail with reference to FIG. 9 while comparing with a conventional electric wire bundle clamp. In FIG. 9, (a), (c), (e) and (g) illustrate a conventional electric wire bundle clamp, while (b), (d), (f) and (h) illustrate the electric wire bundle clamp of this embodiment. More specifically, (a) and (b) show unclamped states, (c) and (d) show clamped states, (e) and (f) show transferring from clamped to unclamping states, and (g) and (h) show clamped states in which upward forces P1 and P2 are exerted on C-shaped elastic curved members 4 and 16, respectively. In clamping, the transfer from (a) to (c) and from (b) to (d) can be done by merely inserting an open end of each elastic curved member between two projections 55*l* and 55*r* or between 28*l* and 28*r*, and thus the operation is simple in both the conventional clamp and the clamp of this embodiment. But, for unclamping from the clamped state, in the conventional clamp, as shown in (e), a force acting in the direction of P3 is exerted on a finger-hold portion 52 and a force P4 exerted on the vicinity of the open end of the C-shaped elastic curved member 4, then the open end is pulled out from between the projections. Thus, it is necessary to apply the bidirectional forces P3 and P4. On the other hand, in the clamp of this embodiment, an obliquely upward force P5 is applied to the fore end of the open end portion or the clamp operating piece 24, whereby the state of (f) is obtained, and a further exertion of the force P5 causes the open end to be disengaged from between the projections 28*l* and 28*r*. Thus, with only the unidirectional force, it is possible to effect unclamping. In the clamped state, particularly in the case where an electric wire bundle is clamped to the full of tolerance in the space between the C-shaped elastic curved member 16 or 4 and the mounting base 14, the force P1 in (g) or P2 in (h) is apt to be applied to the curved member. Especially, in the event the clamped electric wire bundle is touched when mounting or removing other parts, the forces P1 and P2 are often applied to the C-shaped elastic curved members 4 and 16, respectively. In this case, in the conventional clamp, an angle $\theta_1$ formed at the retaining projection 6 becomes an obtuse angle as in (g) and a relative angle $\theta_2$ between the retaining portion 8 and the C-shaped elastic curved member 4 also becomes an obtuse angle, thus permitting an easy disengagement with an external force. In this state curved at an obtuse angle, a further exertion of the force P1 causes the open end of the elastic curved member 4 to be disengaged from between the projections 55*l* and 55*r*, that is, unclamping is done. On the other hand, in this embodiment, exertion of the force P2 results in such a state as (h), in which the bent portion 20 of the curved member 16 is obstructed by the retaining projection 30 so is never disengaged from between the projections 28*l* and 28*r*. Thus, the electric wire bundle once clamped is never unclamped even under exertion of the force P2. In other words, in the wire bundle clamp of this embodiment, unclamping is impossible unless the obliquely upward force P5 is applied to the curved member as in (f). Thus, in the clamp of this embodiment, the electric wire bundle once clamped is held in the clamped state firmly and never unclamped even if the force P2 is applied thereto. In the conventional clamp, the following measure has been considered as means for preventing disengagement; that is, enhancing the rigidity of the C-shaped elastic curved member 4 to prevent an easy deformation under exertion of the force P1. It is also necessary to enhance the rigidity of the finger-hold portion 52. Indeed such an enhancement of rigidity is effective in preventing disengagement, but in case unclamping is needed for some reason or other, it is necessary to apply the forces P3 and P4 artificially as in (e). The enhancement of rigidity results in requirement of larger forces P3 and P4, and thus it is difficult to make disengagement. Thus, in the conventional clamp, an attempt to keep the clamped state of an electric wire bundle involves difficulty in unclamping the wire bundle artificially for some reason or other. On the other hand, in this embodiment, the electric wire bundle once clamped is not unclamped unless the force P5 is applied thereto, and this is true even if the rigidity of the C-shaped elastic curved member 16 is weak. In other words, in the present invention both the easiness of operation and the difficulty of disengagement are compatible with each other without any contradiction. In the conventional clamp, the retaining projection 6 is inserted between the projections 55l and 55r and engaged with the retaining portion 8 whereby it is retained. Therefore, the spacing between the projections 55l and 55r is limited, and the retaining projection 6 at the fore end of the elastic curved member 4 must be inserted correctly. In this inserting operation, it is necessary to position the retaining projection 6 above a gap 58 and then press it downward as shown in (c). This operation is fairly troublesome because the gap 58 is narrow. On the other hand, in this embodiment, a gap 29 between the retaining piece 30 and the right-hand projection 28r can be made larger than the gap 58 in the conventional clamp, thus permitting an easy insertion of the bent portion 20 positioned in the vicinity of the fore end of the elastic curved member 16. This inserting operation can be done by a mere mechanical depression without taking aim exactly. But, in the conventional clamp, it is necessary to guide the retaining projection 6 while taking aim because the gap 58 is narrow, which operation has been troublesome.

Figure 10:
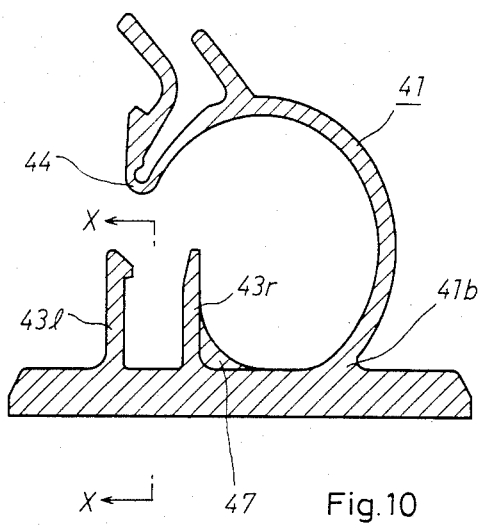
FIG. 10 is a sectional view of an electric wire bundle clamp according to a fourth embodiment of the present invention.
Figure 11:
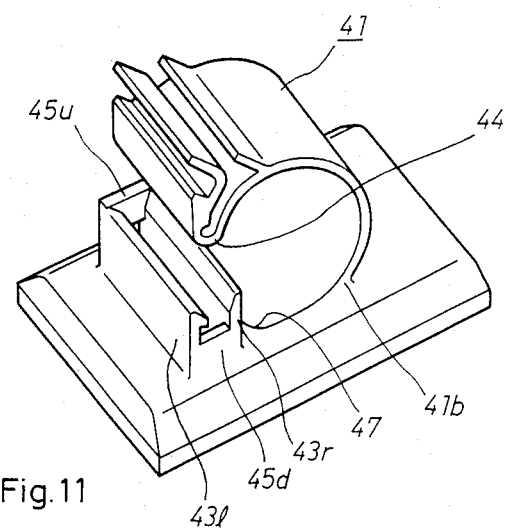
FIG. 11 is a perspective view thereof.
Figure 12:
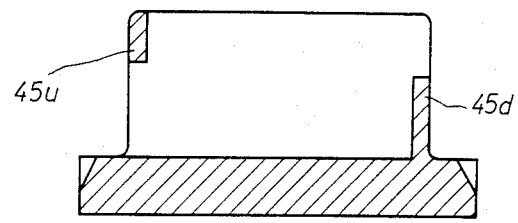
FIG. 12 is a sectional view taken on line X—X of FIG. 10.

Referring now to FIGS. 10, 11 and 12, there is illustrated a fourth embodiment of the present invention, in which a C-shaped elastic curved member 41 is not formed with such elastic protrusions 18 as in the above third embodiment. Like the third embodiment, a projecting portion 43 formed on a mounting base 42 comprises a left-hand projection 43l and a right-hand projection 43r. The right-hand projection 43r is provided with a reinforcing projection 47 extending toward a base portion 41b of the elastic curved member. Further, at both ends in the wire bundle inserting direction of the two projections 43l and 43r, an upper lateral shift preventing wall 45u is provided on one side, while a lower lateral shift preventing wall 45d is provided on the other side, as shown in FIG. 12.

The electric wire bundle clamp of this embodiment having the above construction is different in point of lateral shift preventing mechanism from the third embodiment. In this embodiment, under the action of the lateral shift preventing walls 45u and 45d, a bent portion 44 as an open end of the C-shaped elastic curved member is difficult to shift laterally or in the wire bundle inserting direction, so the electric wire bundle can be clamped firmly. Moreover, under the action of the reinforcing projection 47, the projection 43r is difficult to be deformed, and where the electric wire bundle forms a curved surface, it fits in the clamp more closely.

Figure 13:
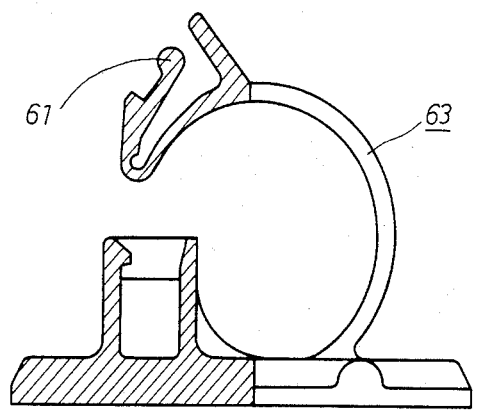
FIG. 13 is a partially sectional front view of an electric wire bundle clamp according to a fifth embodiment of the present invention.
Figure 14:
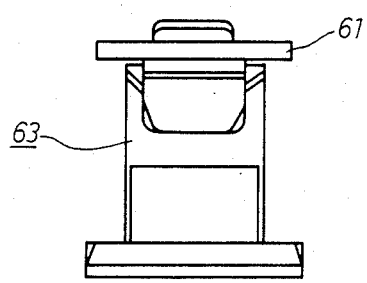
FIG. 14 is a left side view thereof.

Referring now to FIGS. 13 and 14, there is illustrated a fifth embodiment of the present invention, in which a clamp operating rod 61 is provided at the fore end of a C-shaped elastic curved member 63. The clamp operating rod 61 extends in the width direction of the curved member 63 and is formed larger than the width of the latter. By operating the fore end of the clamp operating rod 61 with fingers, the clamp of this embodiment can be easily operated and released.

Figure 15:
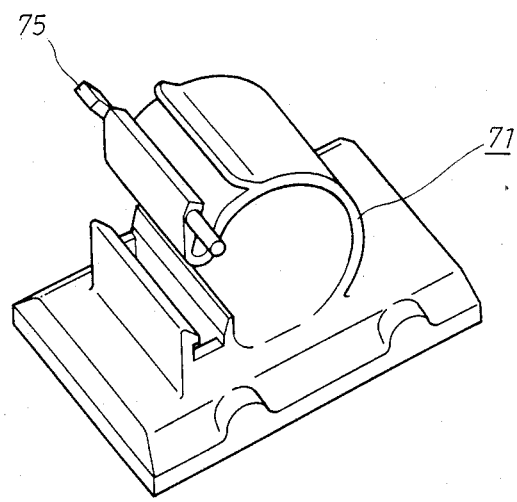
FIG. 15 is a perspective view of an electric wire bundle clamp according to a sixth embodiment of the present invention.

Referring now to FIG. 15, there is illustrated a sixth embodiment of the present invention, in which the clamp operating rod of the fifth embodiment is provided at side thereof with a handle 75. By holding down or gripping the handle 75 with fingers, the clamp of this embodiment can be operated more easily.

Figure 16:
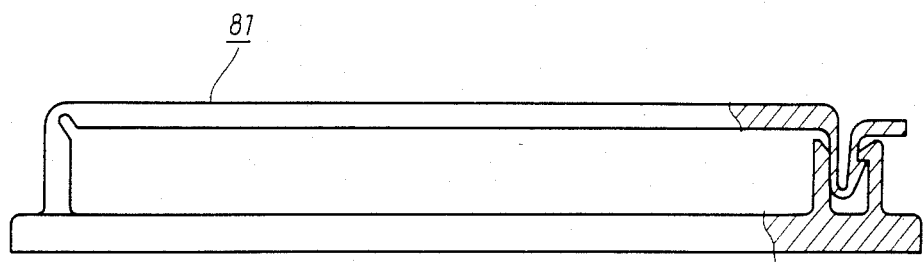
FIG. 16 is a partially sectional front view of an electric wire bundle clamp according to a seventh embodiment of the present invention.

Referring now to FIG. 16, there is illustrated a clamp according to a seventh embodiment of the present invention, which clamp is used for clamping a flat cable. Unlike the foregoing embodiments, an elastic curved member 81 is not C-shaped but in a flat shape which is suitable for clamping a flat cable.

Although the present invention has been described above with respect to its seven embodiments, it is to be understood that the invention is not limited thereto at all and that various modifications may be made within the scope not departing from the gist of the invention.

What is claimed is:

1. An electric wire bundle clamp comprising:
    a mounting base;
    an elastic member having one end extending from a surface of said base;
    a substantially V-shaped bent portion having two substantially parallel legs and defining another end of said elastic member, one said leg of said V-shape forming an extension of the length of said elastic member, the other said leg of said V-shape having a first retaining projection extending therefrom;
    a clamp operating piece extending from said other leg of said V-shape;
    first and second projecting portions extending from said surface of said base, said first and second projecting portions being mutually spaced by a distance sufficient that said V-shaped bent portion can be inserted therebetween; and
    a second retaining projection extending from said first projection portion at a position such that said first and second retaining projections may engage one another when said V-shaped bent portion is inserted between said first and second projecting portions, wherein said clamp operating piece is mounted on said V-shaped bent portion such that said first and second projecting portions are released upon the application of pressure on said clamp operating piece in an opening direction away from a base of said bent portion.

2. The clamp of claim 1 wherein said elastic member is elongate, the length of said elastic member being formed with at least one small diameter arcuate portion defining at least one protrusion of said length.

3. The clamp of claim 1 wherein said elastic member is elongate with a curved length, said curved length being further curved in at least one small diameter arcuate portion therealong, so as to define at least one elastic protrusion of said length.

4. The clamp of claim 3 including a plurality of said small diameter arcuate portions.

5. The clamp of claim 4 wherein said base is rectangular.

6. The clamp of claim 1 including at least one finger hold portion projecting from said elastic member at a position adjacent said clamp operating piece and such that said clamp operating piece is moved in said opening direction when said clamp operating piece is moved toward said finger hold portion.

7. The clamp of claim 1 wherein said first and second projecting portions are mutually parallel and wherein said first and second retaining projections are mutually parallel.

8. The clamp of claim 7 wherein said second projecting portion is formed lower than said first projecting portion, whereby said first retaining projection can be inserted from the top part of said second projecting portion and locked.

9. The clamp of claim 5 wherein said elastic protrusions curve toward said base.

10. The clamp of claim 1 wherein said legs of said V-shape bent portion are more than half as long as said projecting portions.

11. The clamp of claim 1 including a reinforcing projection extending between said base and said second projecting portion.

12. The clamp of claim 1 including an upper lateral shift preventing wall connecting said first and second projecting portions at one side thereof and a lower lateral shift preventing wall connecting said first and second projecting portions at another side thereof.

13. The clamp of claim 1 wherein said clamp operating piece terminates in a clamp operating rod having a width greater than that of said elastic member.

14. The clamp of claim 13 including a handle at one side of said clamp operating rod.

15. The clamp of claim 1 wherein said elastic member is flat.

16. An electric wire bundle clamp comprising:
a mounting base;
an elastic member having one end extending from a surface of said base; and
means for releasably securing another end of said elastic member relative to said base;
wherein said elastic member is elongate with a curved length, portions of said curved length being further curved at small diameter arcuate portions so as to define a plurality of elastic protrusions along said length, whereby stresses on said elastic member will cause distortions of said arcuate portions and a change in said curved length.

* * * * *